United States Patent [19]

Wilgus

[11] Patent Number: 4,845,817
[45] Date of Patent: Jul. 11, 1989

[54] METHOD OF FORMING A HALF-ROUND BEARING

[75] Inventor: Richard M. Wilgus, DeGraff, Ohio

[73] Assignee: J. P. Industries, Inc., Ann Arbor, Mich.

[21] Appl. No.: 212,906

[22] Filed: Jun. 29, 1988

[51] Int. Cl.⁴ .................. B21D 53/10; F16C 33/02
[52] U.S. Cl. .................. 29/149.5 R; 29/149.5 B; 29/149.5 C; 29/149.5 DP; 384/288; 384/294
[58] Field of Search .................. 29/149.5 R, 149.5 S, 29/149.5 C, 149.5 B, 149.5 DP; 51/289 R; 384/288, 294, 295, 296

[56] References Cited

U.S. PATENT DOCUMENTS

| | | |
|---|---|---|
| 2,814,856 | 12/1957 | Ward .................. 29/149.5 DP |
| 3,149,404 | 9/1964 | Sims .................. 29/149.5 R |
| 3,251,119 | 5/1966 | Kingsbury et al. .................. 29/149.5 S |
| 3,350,773 | 9/1963 | Beebe et al. .................. 29/149.5 R |
| 3,375,563 | 4/1968 | Kingsbury et al. .................. 29/149.5 S |
| 4,541,157 | 9/1985 | Tsushima et al. .................. 29/149.5 R |
| 4,663,810 | 5/1987 | Kramer .................. 29/149.5 S |

FOREIGN PATENT DOCUMENTS 107233 6/1983 Japan .................. 29/149.5 S

Primary Examiner—Howard N. Goldberg
Assistant Examiner—Peter D. B. Vo
Attorney, Agent, or Firm—Harness, Dickey & Pierce

[57] ABSTRACT

A half-round bearing including a locating tab for establishing the positioning of the bearing shell when being mounted within a bearing housing. Generating tabs according to the prior art leave a radially outwardly projecting channel in the bearing crown surface which has been found to create slivers during finishing of the bearing shell wall thickness which can adversely influence bearing life. According to this invention, the bearing material is upset by coining in a manner such that the excess material is removed during the parting line broaching operation without causing a burr to be formed on the tab. The burr can prevent proper seating of the bearing shell in the bearing housing which reduces bearing life.

9 Claims, 2 Drawing Sheets

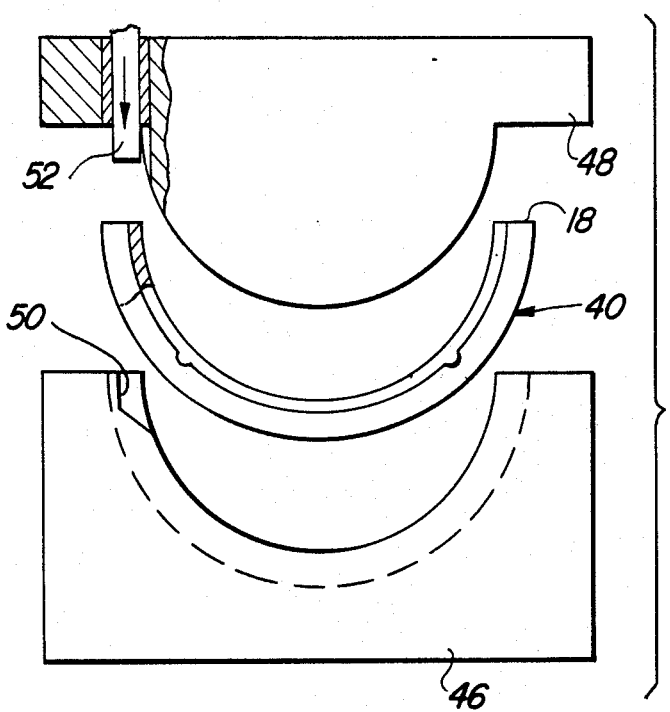
_Fig-5_
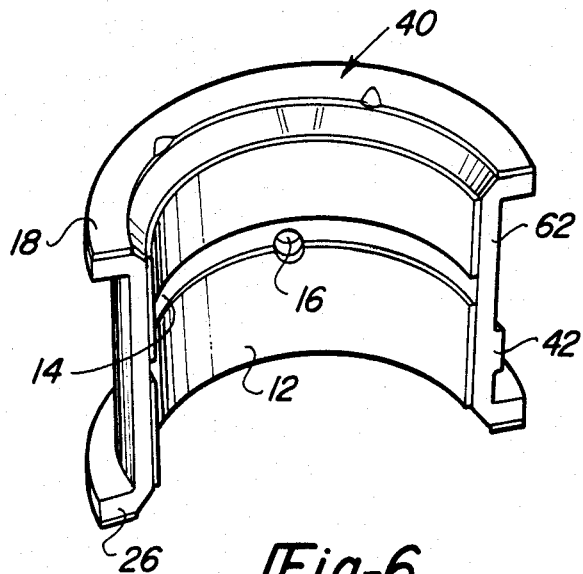
_Fig-6_

METHOD OF FORMING A HALF-ROUND BEARING

BACKGROUND AND SUMMARY OF THE INVENTION

This invention relates to a half-round fluid film bearing having an improved locating notch configuration.

Half-round type fluid film bearings are used in widespread applications including nearly all of the crankshaft and connecting rod bearings used in conventional internal combustion engines for motor vehicles. These types of bearings have a pair of arc-shaped shell segments which are mounted to the engine block and a bearing cap and surrounds a cylindrical journal of the crankshaft. The bearings form a concave bearing crown area which faces the journal and have a pair of parting faces at their ends. Lubricant is forced under pressure to the clearance space between the bearing and the journal to provide an oil film which supports the journal and provides low rotational friction. Most half-round bearings in use today include a locating tab at one of the parting faces of each of the half-round bearing shells which project in a radially outward direction. These locating tabs are used to properly establish the positioning of the bearing shells until the supporting housings are completely assembled. The use of locating tabs has greatly reduced instances of bearing distress caused by misassembly.

The locating tab configuration presently in use for half-round bearings is typically a locally radially outwardly displaced segment of the bearing material at the shell parting face which leaves a channel formed in the crown surface of the bearing shell. Half-round bearings are typically manufactured beginning with flat sheet stock made up of a number of layers of various materials which is formed to the half-round configuration with the locating tab. The parting faces of the bearing shell are thereafter broached to control the arc length of the bearing. Due to the local discontinuity in one of the parting faces of the bearing caused by the existence of the locating tab, the broaching tools can sometimes leave burrs in the area of the locating tab which can prevent the proper seating of the bearing shell in the housing. The crown surface is broached to a predetermined thickness called the bearing wall. In the channel formed in the crown surface of the bearing shell, the wall broaching operation sometimes causes a sliver of lining material to be generated. Removal of this sliver is difficult and if the sliver breaks free can lead to premature bearing wear. Accordingly, there is a need to provide an improved locating tab configuration for half-round bearings which alleviates the problems of sharp edges presented by the locating tab and slivers in the channel.

The improved half-round bearing in accordance with this invention achieves the above mentioned desirable features through the use of a coining method which locally upsets the bearing metal to form a radially outwardly projecting tab, while maintaining the integrity of the bearing crown surface in that area. In a subsequent broaching operation, the bearing material at the parting face is trimmed such that the notch resulting from the coining procedure is removed, leaving no burrs in the area of the locating tab. Slivers are prevented by the integrity of the bearing crown surface. These changes overcome the undesirable features of bearing designs according to the prior art.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 5 is an exploded elevational view of a coining tool used for forming the bearing locating tab shown in FIG. 3.

FIG. 6 is a pictorial view of a completed half-round bearing shell according to this invention with an end portion thereof removed by broaching and without the channel in the crown surface.

DETAILED DESCRIPTION OF THE INVENTION

Figure 1:
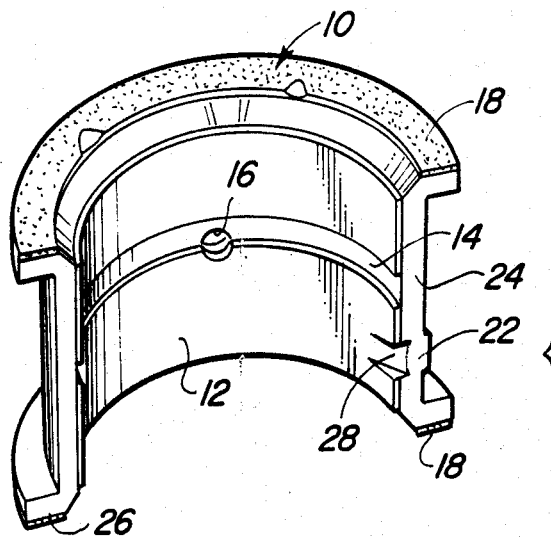
FIG. 1 is a pictorial view of a half-round bearing shell showing a locating tab according to a prior art configuration.

With reference to FIG. 1, a half-round bearing shell in accordance with the prior art is shown which is generally designated by reference number 10. Bearing shell 10 includes an inside crown area 12 which faces the journal surface of a rotating journal (not shown) and has an oil groove 14 supplied with lubricant through oil supply hole 16. Radially extending thrust faces 18 are provided for thrust bearing capabilities. A pair of bearing shells 10 are assembled with parting faces 24 and 26 of one shell abutting corresponding surfaces of another shell. The figures illustrate a grooved flanged bearing shell 10 with oil supply hole but the concepts of this invention apply to an ungrooved flanged bearing shell with or without an oil supply hole or a straight bearing (bearing shells without flanges) shell either grooved or ungrooved and with or without an oil supply hole.

Figure 2:
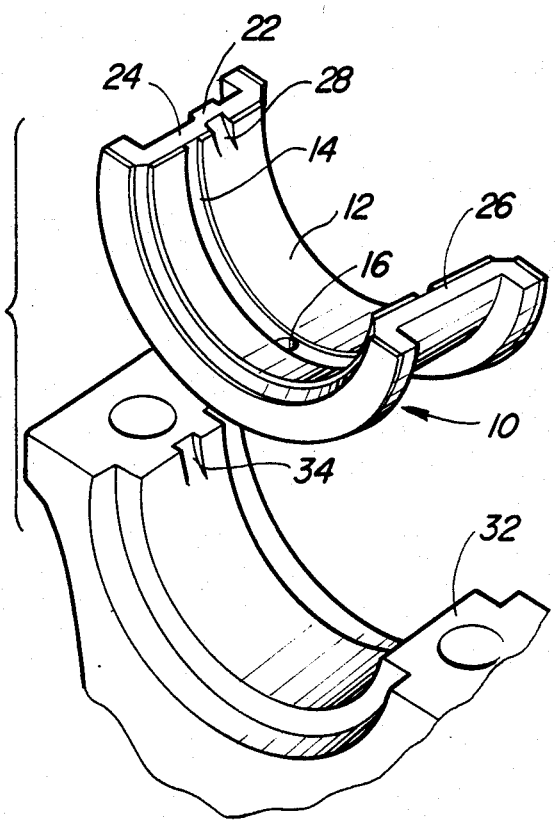
FIG. 2 is a pictorial view showing the bearing shell of FIG. 1 being loaded into a bering housing and showing the locating tab of the bearing in position to engage a locating notch of the housing.
Figure 3:
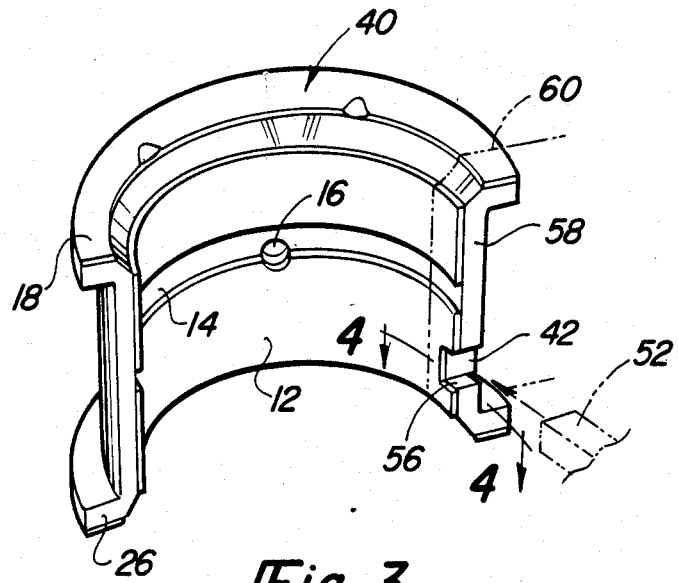
FIG. 3 is a pictorial view of a half-round bearing showing a locating tab and without the channel in accordance with the present invention in an initial stage of fabrication.
Figure 4:
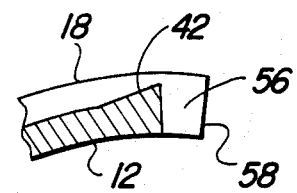
FIG. 4 is a cross-sectional view taken along line 4—4 of FIG. 3.

As shown in FIG. 1, bearing shell 10 further includes locating tab 22 which is formed by locally upsetting the material adjacent parting face 24 and displacing it radially outwardly, thereby forming channel 28 within crown area 12. As previously mentioned, and as shown in FIG. 2, locating tab 22 is provided to properly locate bearing shell 10 when it is being loaded into bearing housing 32. Housing 32 forms locating notch 34 which corresponds in shape to that of bearing shell locating tab 22.

During the fabrication process of bearing shell 10, after the steps of forming locating tab 22, broaches are used to remove material from parting faces 24 and 26. As the broach moves along face 24, it interacts with the discontinuity formed by tab 22 which, as mentioned previously, has been found to leave difficult to remove burrs which can prevent proper seating of the bearing shell in the housing. Further, a round broach is used to remove material from crown are 12 to generate a desired wall thickness of the bearing shell 10. As the broach moves along crown area 12, it encounters channel 28 resulting in a sliver being formed as the broach passes through the empty space of channel 28.

FIGS. 3 through 6 illustrate half-round bearing shell 40 in accordance with the present invention. Features of bearing shell 40 which are identical of those of bearing shell 10 are identified by like reference numbers. Bearing shell 40 varies from bearing shell 10 with respect to the configuration of the locating features used. FIG. 6 illustrates the completed bearing shell 40 in which crown area 12 in the area of locating tab 42 is free from sliver causing discontinuities, thus improving over the previously described prior art structure. Because less material is removed past the bottom of notch 56 during the broaching away of the material of end 58 compared to the amount removed if notch 56 is absent, burrs are not formed on the face 62 of tab 42. Again, this is an improvement over the prior art structure.

FIG. 5 illustrates forming tools 46 and 48 which may be used to generate locating tab 42 according to this invention through coining. Tool 46 forms the female die cavity for the forming operation whereas tool 48 forms the male portion. Bearing shell 40 is loaded into tools 46 and 48 which are then clamped together. Forming tool 46 defines an outwardly projecting cavity 50 and tool 48 carries a movable forming plunger 52.

Once forming tools 46 and 48 are clamped together onto a workpiece, plunger 52 is forcibly depressed thus upsetting the material of bearing shell 40 and forming it into cavity 50. Following this operation, bearing shell 40 has the configuration shown in FIGS. 3 and 4 having notch 56 with outwardly projecting locating tab 42. The forming operation causes a portion of shell 40 to have an increased radial thickness which leaves crown area 12 undisturbed in the area of tab 42. In a subsequent operation, material at end 58 is trimmed away by broaching to the area of phantom line 60.

FIG. 6 shows the completed bearing shell 40. During the parting line broaching step, the material of end 58 is removed past the bottom of notch 56, thus leaving a smooth parting face 62 without burrs at the tab 42. The completed bearing shell 40 has a configuration which allows it to be properly located within conventional bearing housing 32 as shown in FIG. 2. The wall broaching operation removes material from crown area 12 to obtain the desired wall thickness. In this finishing step, no discontinuity is encountered at tab 42 capable of generating a sliver as is encountered in the prior art at tab 22, and channel 28.

While the above description constitutes the preferred embodiments of the present invention, it will be appreciated that the invention is susceptible to modification, variation and change without departing from the proper scope and fair meaning of the accompanying claims.

What is claimed is:

1. A method of forming a half-round bearing for supporting a journal and having a locating tab for interengagement with a locating notch of a bearing housing, comprising the steps of:

providing a half-round bearing shell defining an inside crown area for facing the journal, and a pair of parting faces, deforming said bearing shell to define said locating tab and forming a notch in one of said parting faces, and trimming away said one of said parting faces to remove said notch and leaving said locating tab thereby providing said locating projection without deforming said crown area of said shell in the area of said locating tab.

2. A method of forming a half-round bearing according to claim 1 wherein said trimming step is conducted by broaching.

3. A method of forming a half-round bearing according to claim 1 wherein said deforming step is completed by providing a male and female forming die, said female die forming a cavity conforming to the desired configuration of said locating tab, said male die having a moving plunger which engages one of said shell parting faces and deforms said bearing shell into said cavity.

4. A method of forming a half-round bearing according to claim 3 wherein said plunger is movable in a direction normal to said one of said parting faces.

5. A method of forming a half-round bearing according to claim 3 wherein said plunger is movable in a direction generally tangent to the cylindrical surface defined by said crown area.

6. A method of forming a half-round bearing for supporting a journal and having a locating tab for interengagement with a locating notch of a bearing housing, comprising the steps of:

providing a half-round bearing shell formed from sheet metal and having a generally uniform thickness and forming an inside crown area facing the journal and a pair of parting faces, deforming said bearing shell by forcing a plunger into one of said parting faces thereby forming a notch in said parting face and forming a locating tab defined by a section of said shell having an increased thickness, and trimming away said parting face to remove said notch and leaving said locating tab.

7. A method of forming a half-round bearing according to claim 6 wherein said plunger is movable in a direction normal to said one of said parting faces.

8. A method of forming a half-round bearing according to claim 6 wherein said trimming step is conducted by broaching.

9. A method of forming a half-round bering according to claim 6 wherein said plunger is movable in a direction generally tangent to the cylindrical surface defined by said crown area.

* * * * *